(12) United States Patent
Bailiang

(10) Patent No.: US 8,928,657 B2
(45) Date of Patent: Jan. 6, 2015

(54) PROGRESSIVE DISCLOSURE OF INDOOR MAPS

(71) Applicant: Google Inc., Mountain View, CA (US)

(72) Inventor: Zhou Bailiang, Balgowlah (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/788,566

(22) Filed: Mar. 7, 2013

(65) Prior Publication Data
US 2014/0253538 A1 Sep. 11, 2014

(51) Int. Cl.
| G06T 15/00 | (2011.01) |
| G06T 17/00 | (2006.01) |
| G09G 5/00 | (2006.01) |
| G09G 5/02 | (2006.01) |
| G06F 3/00 | (2006.01) |
| G06F 3/048 | (2013.01) |
| G06T 15/08 | (2011.01) |

(52) U.S. Cl.
CPC ..................................... G06T 15/08 (2013.01)
USPC ........... 345/419; 345/420; 345/428; 345/592; 345/619; 345/660; 345/661; 345/664; 345/665; 715/700; 715/815; 715/848; 715/850

(58) Field of Classification Search
CPC ......... G06T 11/00; G06T 11/20; G06T 11/40; G06T 11/60; G06T 11/80; G06T 13/00; G06T 13/20; G06T 13/80; G06T 19/00; G06T 19/003; G06T 19/20; G06T 15/00; G06T 15/005; G06T 15/10; G06T 15/20; G06T 15/205; G06T 17/00; G06T 17/005; G06T 17/05; G06T 17/10; G06T 17/20; G06T 17/30; G06F 3/048
USPC ......... 345/418, 419, 428, 589, 592, 619, 642, 345/660, 420, 581, 661, 664–666, 345/473–475; 715/700, 764, 781, 810, 815, 715/848–852, 863
See application file for complete search history.

(56) References Cited

U.S. PATENT DOCUMENTS

| 2008/0062167 A1* | 3/2008 | Boggs et al. .................. 345/419 |
| 2008/0320419 A1* | 12/2008 | Matas et al. .................. 715/863 |
| 2010/0023252 A1* | 1/2010 | Mays et al. .................. 701/201 |
| 2010/0104174 A1* | 4/2010 | Rohlf et al. .................. 382/154 |
| 2012/0050332 A1* | 3/2012 | Nikara et al. ................. 345/660 |

* cited by examiner

Primary Examiner — Ke Xiao
Assistant Examiner — Jed-Justin Imperial
(74) Attorney, Agent, or Firm — Marshall, Gerstein & Borun LLP

(57) ABSTRACT

A digital map of a geographic area is displayed via a user interface, and a 3D representation of a building located in the geographic area is displayed on the digital map. A virtual camera is used to view the digital map, and the location of the virtual camera is changeable in response to user input. The external shell of the 3D representation is made increasingly transparent as a virtual camera approaches the 3D representation of the building to reveal indoor information for the building.

13 Claims, 8 Drawing Sheets

PROGRESSIVE DISCLOSURE OF INDOOR MAPS

FIELD OF THE DISCLOSURE

The present disclosure relates to interactive digital maps and, more particularly, to providing an interface for interacting with representations of buildings displayed as part of digital maps on a computing device.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Today, a wide variety of computing devices, including many portable devices, support software applications that display interactive digital maps ("mapping applications"). For example, mapping applications may run on laptop and tablet computers, mobile phones, car navigation systems, hand-held global positioning system (GPS) units, etc. Many of these devices are equipped with a touchscreen, a touchpad, or are otherwise configured to receive input that includes finger gestures. A user may, for example, pan across a map by swiping her finger in the desired direction, zoom in on an area by pinching two fingers together, zoom out on an area by spreading two fingers apart, etc.

In general, a mapping application can display various types of geographic data including topographical data, street data, urban transit information, and traffic data. Further, the geographic data may be schematic or based on photography, such as satellite imagery. Still further, a mapping application can display the information in a two-dimensional (2D) or three-dimensional (3D) format.

A user sometimes may operate a mapping application to view a map of an urban area with street names, names of landmarks, etc. The map may include representations of buildings rendered as a 2.5D representation of the building (in which an approximation of the building is rendered by extruding the shape of the building from the surface) or 3D representation of the building, with or without textures. If map information about the interior of the building is available, it may be advantageous for such maps to include information about interior floors of representations of buildings included on the map.

SUMMARY

One embodiment of the techniques discussed below is a method providing an intuitive display of a building on a digital map. The digital map is implemented in a computing device having a user interface. The method includes displaying a digital map of a geographic area via a user interface of the computing device from a perspective of a virtual camera, changing a position of the virtual camera in response to user input; and displaying, on the digital map, a three-dimensional (3D) representation of a building located in the geographic area, including progressively increasing transparency of an external shell of the 3D representation of the building to reveal indoor information for the building as the virtual camera approaches the 3D representation of the building.

Another embodiment of the techniques described in the present disclosure is a method in a computing device for providing a digital map via a user interface. The method includes displaying a digital map of a geographic area via a user interface of the computing device from a perspective of a virtual camera; and displaying, on the digital map, a three-dimensional (3D) representation of a building located in the geographic area, including: not displaying an indoor map when a distance between the virtual camera and the 3D representation of the building is greater than a threshold value, and displaying (i) an indoor map of an internal floor of the building and (ii) at least a portion of an outer shell of the building disposed between the internal floor of the building and the virtual camera when the distance between the virtual camera and the 3D representation of the building is smaller than a threshold value.

In yet another embodiment, a computing device includes a user interface, one or more processors, and a memory. The memory stores instructions that when executed by the one or more processors cause the computing device to display a digital map of a geographic area via the user interface from a perspective of a virtual camera; display, on the digital map, a three-dimensional (3D) representation of a building located in the geographic area, wherein the 3D representation of the building includes an opaque outer shell that obscures internal features of the building; receive a selection of the 3D representation of the building via the user interface, and in response to the selection of the 3D representation of the building, display the outer shell in an at least partially transparent manner to reveal the internal features of the building.

DETAILED DESCRIPTION

A mapping software module operating on a computing device displays an interactive digital map of a geographic region in which one or more buildings are located. The mapping software module provides an intuitive, space-efficient, and aesthetically pleasing user interface for inspecting the internal features of the multi-story building, such as interior floor maps that include floor contours as well as internal wall layout and names of individuals or organizations occupying different floors of the building.

In one example implementation, the mapping software module displays a 2D schematic digital map that includes 2.5D and/or 3D outlines of buildings, which may be displayed to scale with the map. In general, the user changes the distance between the virtual camera and the representation of the building via the user interface (e.g., by a command to change location of the virtual camera on the x, y, and/or z axes). For example, a user inputs a command (e.g., a spread gesture) to a user interface to cause the mapping software to zoom in on a section of the map (i.e., decreasing the height of the camera relative to the map). Zooming may include displaying a section of the map at a higher resolution. Additionally, the 3D representations of one or more buildings may increase in size. The mapping software may also alter the 3D representations of one or more buildings by increasing the transparency of the one or more buildings. Further, the mapping software may display an interior floor map of the one or more buildings inside the space defined by the 3D representations of the one or more buildings. In effect, using the zoom command, the user is able to virtually look into a building from the outside to see the layout of the interior of the building. If the building has more than one interior floor, the mapping software module may display a default interior floor map. The default floor may depend on the type of building (e.g., the ground floor of an office skyscraper, the departure and ticketing floor of an airport, etc.).

These techniques are discussed in more detail below with reference to FIGS. 1-8. In particular, an example system in which a mapping software module may interactively present internal features of buildings is described with reference to FIG. 1, example screenshots of the mapping software module are discussed with reference to FIGS. 2-5, and example methods which the mapping software module may implement to provide a user interface for inspecting internal features of buildings are discussed with reference to FIGS. 6-8.

Figure 1:
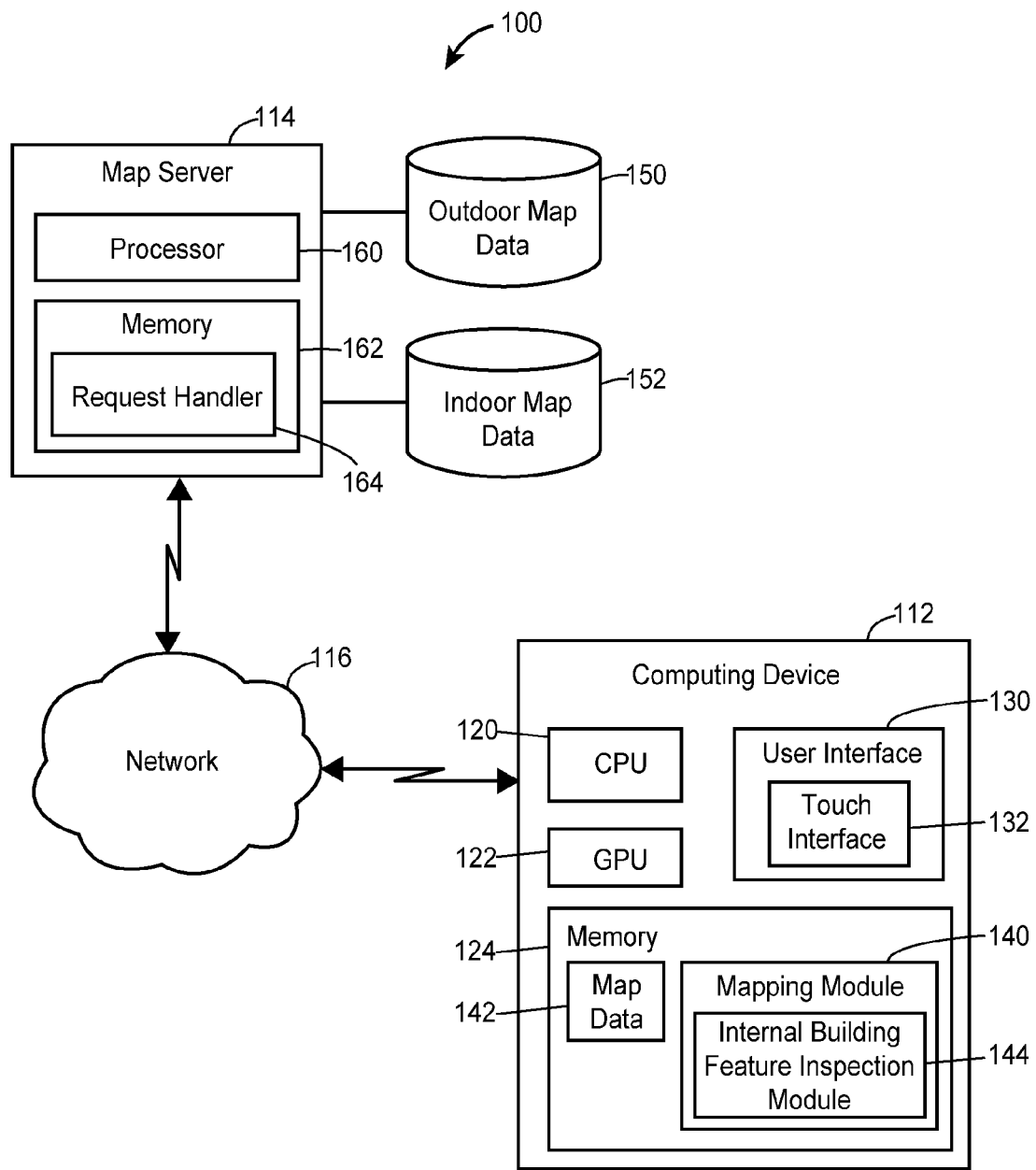
FIG. 1 is a block diagram of an example system in which techniques for generating and displaying a representation of a building at various levels of transparency in a mapping application are implemented.

Referring first to FIG. 1, a system 100 includes a computing device 112 coupled to a map server 114 via a communication network 116. The computing device 112 can be, for example, a laptop computer, a tablet computer, a smartphone, etc. In the embodiment illustrated in FIG. 1, the computing device 112 includes a central processing unit (CPU) 120, a graphics processing unit (GPU) 122, a computer-readable memory 124, and a user interface 130 including a touch interface 132. In various implementations, the touch interface 132 can include a touchpad over which the user moves his or her fingers while looking at a separately provided screen, a touchscreen where the user places his or her fingers directly over the image being manipulated or over a displayed control being activated (e.g., a displayed keyboard), etc. The memory 124 is a computer-readable non-transitory storage device that may include both persistent (e.g., a hard disk) and non-persistent (e.g., RAM) memory components, stores instructions executable on the CPU 120 and/or the GPU 122 that make up a mapping software module 140 and map data 142 on which the mapping module 140 operates. The mapping software module 140 includes an internal building feature inspection module 144 that allows users to easily inspect internal features of multi-story buildings.

The mapping software module 140 according to various implementations operates as a separately executable software application, a plugin that extends the functionality of another software application such as a web browser, an application programming interface (API) invokable by a software application, etc. The instructions that make up the mapping software module 140 may be compiled and executable on the CPU 120 and/or the GPU 122 directly, or not compiled and interpreted by the CPU 120 at runtime. Further, the internal building feature inspection module 144 may be provided as an integral part of the mapping software module 140 or as a separately installable and downloadable component.

Depending on the implementation, the map data 142 may be in a raster format, such as Portable Network Graphics (PNG), a vector graphics format (based on mathematical descriptions of geometric shapes), or any other suitable format. The map data 142 in some cases is divided into map tiles, or portions of a map image having a certain fixed size, such as 256 by 256 pixels. In operation, the mapping module 140 receives the map data 142 from the map server 114, renders a map image based on the map data, and causes the map image to be displayed via the user interface 130. When the map data 142 is already rasterized, the mapping module 140 renders the map image by selecting and combining the proper rasterized tiles. However, if the map data 142 is in a vector graphics format, the mapping module 140 interprets the descriptions of various shapes to generate the corresponding raster images. The mapping module 140 also adjusts the displayed image and requests new map data, when necessary, in response to user input received via the user interface 130. More specifically, the user may change the zoom level, pan across the map, select a different map type (e.g., traffic map, terrain map), and otherwise interact with the map.

In an example scenario, the map server 114 receives a request that specifies the geographic area, the zoom level, and the map type. The map server 114 in response retrieves outdoor map data and indoor map data from an outdoor map database 50 and an indoor map database 52, respectively. The map server 114 then provides the outdoor map data, the indoor map data, and appropriate indications of how certain portions of the outdoor map data and the indoor map data are linked, to the computing device 112 as part of the map data 142.

When provided in a vector graphics format, outdoor map data may specify individual map elements representing such physical entities as roads, parks, bodies of water, external walls of buildings, and other natural and artificial objects visible outside (e.g., from above or at a street level). In a raster format, map elements typically are embedded into the same image. Outdoor map also may include text-based data for displaying various labels such as street names or names of landmarks. In general, outdoor map data may be for generating 2D images or 3D images, and may include schematic data, photographic images, or both.

Indoor map data may specify internal features of buildings such as the layout of internal walls or dividers, names of people, businesses, and organizations occupying different portions of a building, locations of elevators, escalators, restrooms, etc. For multi-story buildings, the indoor map data may specify internal features on a per-floor basis. Similar to outdoor map data, indoor map data may include both graphics content and non-graphics (e.g., text) content, and the graphics content may include schematic illustrations, photographic images, interactive and non-interactive icons, etc.

Certain portions of the outdoor map data may be logically linked to respective portions of indoor map data. In particular, certain map elements displayed on a map may be linked to indoor data that typically is not displayed on the map without an additional user request. In other words, certain map elements may be associated with additional map data that is not part of the map image typically displayed for the specified geographic region, map type, and zoom level. The map server 114 can provide outdoor map data and/or indoor map data as a collection of separate data structures, each containing a vector-based description of a map element, text-based label data, and metadata that further contains a unique identifier of another data structure storing the corresponding indoor map data. If the outdoor map data included in the map data 142 is rasterized, the unique identifier of a data structure storing indoor map data can be provided for a particular set of coordinates in the raster image. In either case, the mapping software module 140 can display the outdoor map data and provide interactive controls for activating the display of relevant indoor map data.

As a more specific example, according to one implementation, the map server 114 provides, as part of outdoor map data, external representations of buildings in the form of low-detail 3D outlines. The mapping software module 140 superimposes these 3D outlines over a 2D map. In another implementation, the map server 114 provides 3D mesh descriptions of buildings along with photographic imagery for texturing the corresponding 3D meshes. Using this type of map data, the mapping software module 140 can generate realistic, highly detailed external representations of buildings. In yet another implementation, the map server 114 provides merely 2D outlines, or "footprints" of buildings on a 2D map. A user can zoom in on these 3D external representations of buildings to instruct the mapping software module 140 to increase the transparency of the 3D external representations of buildings and to display interior map data within the partially (or wholly) transparent 3D external representations of buildings. It may be advantageous to create 3D representations of buildings with detailed information about the shape and contours of the building being represented (e.g., creating a representation of the Chrysler Building including a detailed modeling the distinctive Art Deco top), but it may also be advantageous to create 3D representations of buildings using 2.5D rendering techniques. In 2.5D rendering, the shape of the base of the building is extruded from the base of the map to the appropriate altitude above the surface of the map to approximate the shape of the building.

With continued reference to FIG. 1, the map server 114 may include a processor 160 and a memory 162 that stores a request handler 164, made up of instructions executable on the processor 160. The computing device 112 and the map server 114 may communicate in a client-server mode, where the computing device 112 sends requests for map data to the map server 114, and the map server 114 provides map data in response to these requests. More particularly, the request handler 164 in operation receives requests for map data from the computing device 112, identifies and retrieves the requisite map data from the outdoor map database 150 and/or the indoor map database 152, formats response messages that contain the map data, and causes the response messages to be transmitted to the computing device 112 via the network 116, which may be a wide area network (WAN) such as the Internet, a local area network (LAN), or any other suitable type of a network.

For simplicity, FIG. 1 illustrates the map server 114 as only one instance of a server device. However, the map server 114 according to some implementations includes in a group of one or more map server devices, each equipped with one or more processors and capable of operating independently of the other map server devices. Map server devices operating in such a group can process requests from the computing device 112 individually (e.g., based on availability), in a distributed manner where one operation associated with processing a request is performed on one map server device while another operation associated with processing the same request is performed on another map server device, or according to any other suitable technique. For the purposes of this discussion, the term "map server" may refer to an individual map server device or to a group of two or more map server devices.

Figure 2:
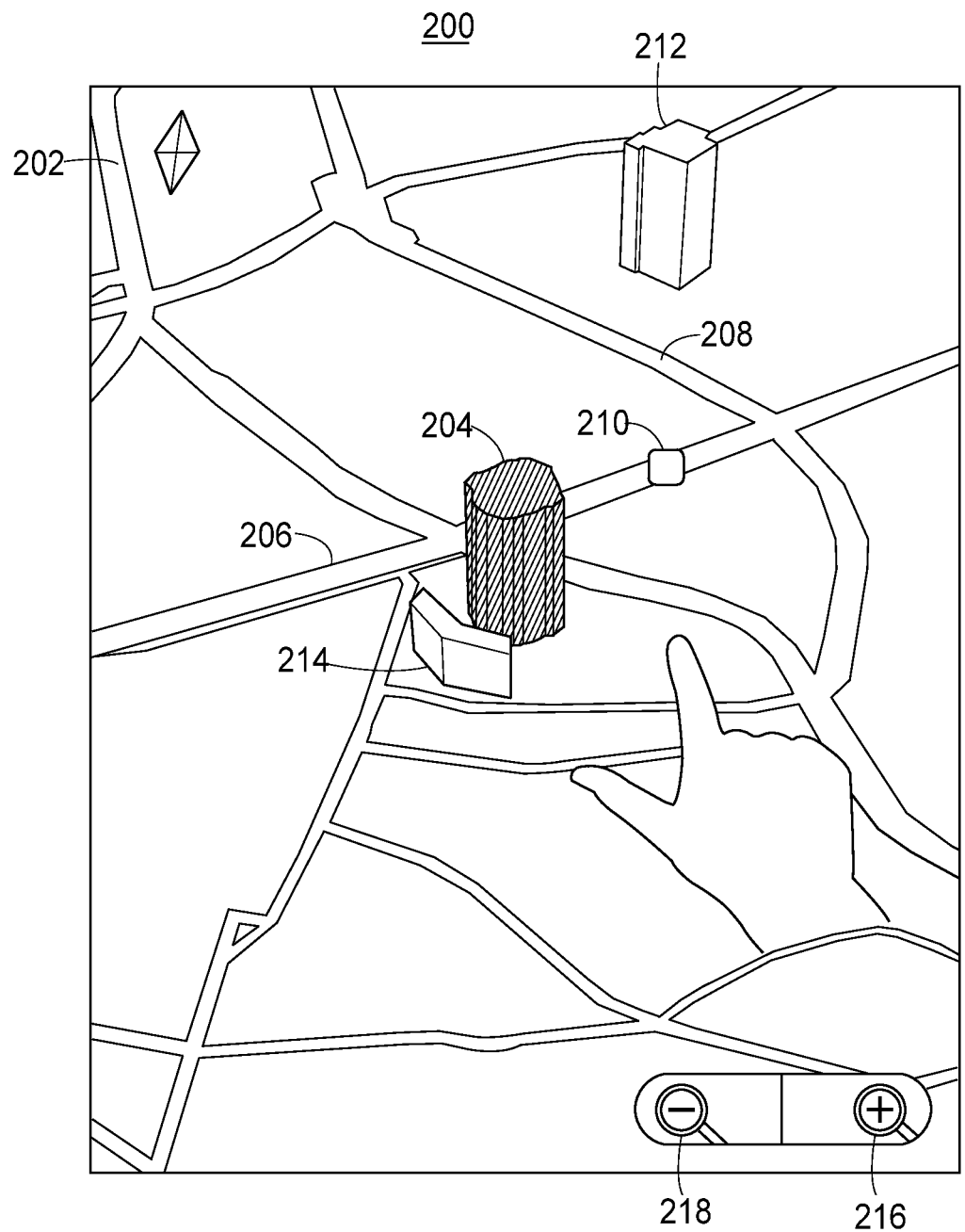
FIG. 2 is an example screenshot of a digital map including a substantially opaque building with no visible interior floor maps.

Now referring to FIG. 2, an example screenshot 200 illustrates a number of 3D representations of buildings 204, 212, 214 overlaying a digital map of a geographic area 202. In this example, the map 202 illustrates several city blocks and includes various outdoor map elements such as, railroad tracks 206, roads 208, and representations of buildings 204, 212, and 214. The map 202 also can include icons and text labels corresponding to outdoor map data, such as a mass transit icon 210, for example. A mapping software (e.g., the internal building feature inspection module 144 operating in the mapping software module 140 of FIG. 1 or a similar module) may provide functions for interacting with outdoor map data such as rotate, zoom, pan, etc., as well as functions for inspecting internal features of buildings when indoor map data is available. In the example of FIG. 2, the 3D representations of buildings 204, 212, or 214 are 3D shapes displayed according to an isometric projection. In another implementation, however, these outlines can be illustrated with a two-point perspective. More generally, and as discussed above, buildings and other structures for which indoor map data is available generally can be illustrated using any suitable 2D or 3D shapes rendered with any desired level of detail. The screenshot includes a zoom-in button 216 as well as a zoom-out button 218. The hand appearing in FIG. 2 is not part of the screenshot 200, but merely indicates that in certain embodiments, the user interface presenting the display may accept multi-touch inputs such as pinching, typically interpreted as a zoom-out command, or spreading, typically interpreted as a zoom-in command. The user interface presenting the display may also accept tapping commands to identify a single building to make transparent according to the techniques discussed below. For example, the user may tap on (or otherwise select) the representation of the building 204 (or an icon associated with the building 204) to render the building partially transparent and display an interior map as discussed in connection to FIGS. 3-5. Alternatively or additionally, all of the buildings in the frustum with interior map information may be made more transparent as a result of a zoom-in command or less transparent as a result of a zoom-out command as discussed below.

Figure 3:
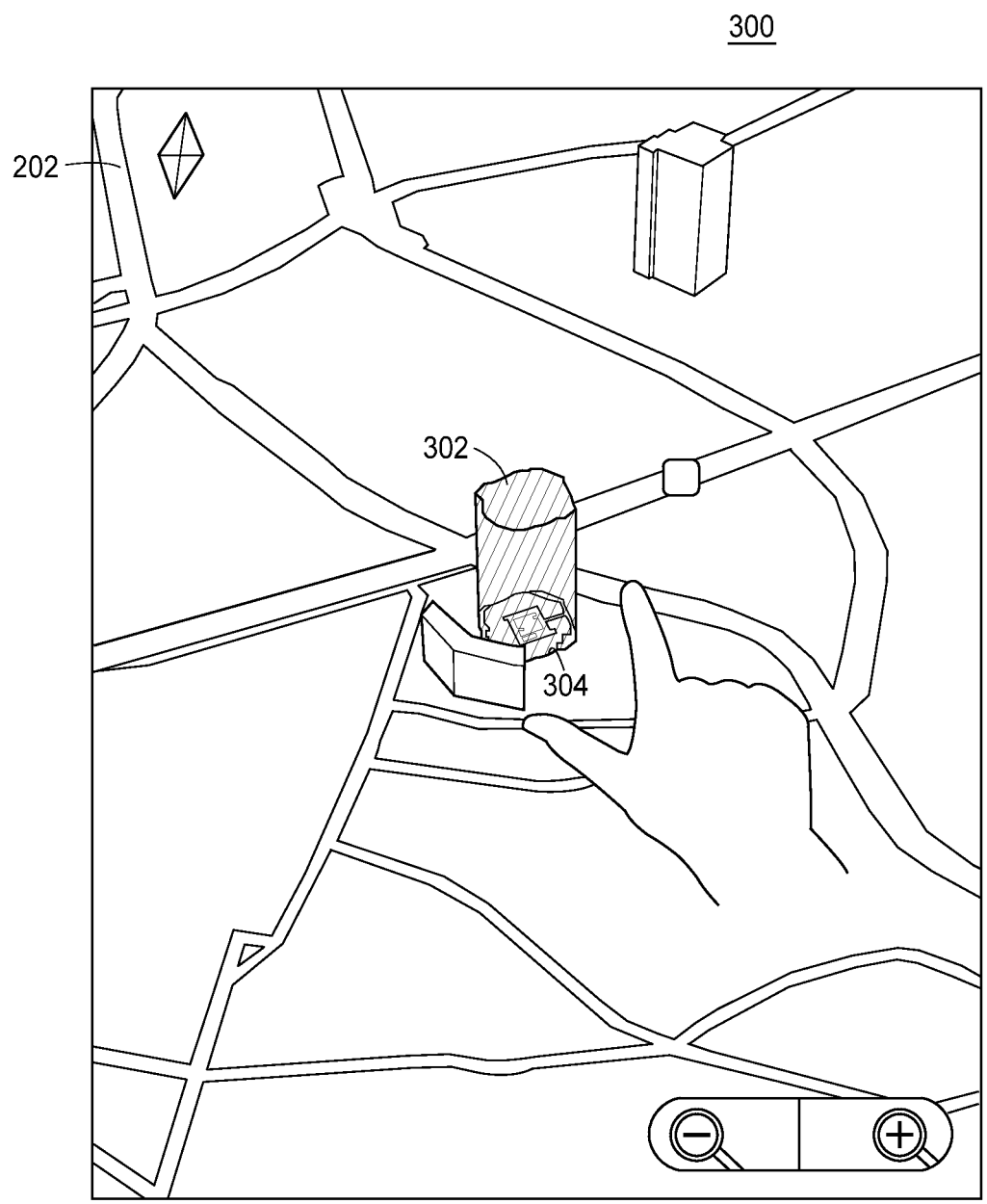
FIG. 3 is an example screenshot of a digital map including a partially transparent building with a visible interior floor map.

Now referring to FIG. 3, another example screenshot 300 illustrates the map of a geographic area 202 of FIG. 2, in which the representation of the building 204 is represented as a partially transparent 3D representation of the building 302 after the user has selected the representation of the building 204 to make the representation partially transparent. A representation of the building 302 may be made partially transparent by making any part of the external shell of the building partially transparent. For example, the roof and/or vertical walls of the representation of the building 302 may be made partially transparent. Indoor and outdoor map data are displayed within a same viewport in this example. An interior floor map 304 may be drawn inside the 3D space defined by the partially transparent 3D representation of the building 302. As discussed in the present disclosure, the interior floor map 304 may be an interior floor map of the default floor. In this instance, the default floor is the ground floor of the Mori Tower in Tokyo, Japan. Although the map 302 is a 2D map on which most map elements are illustrated with a one-point projection, the a partially transparent 3D representation of the building 302 and interior floor map 304 in general can overlay any other suitable type of a map such as a 3D map, for example. As discussed in the present disclosure, the presentation of the partially transparent 3D representation of the building 302 and the interior floor map 304 may be a result of a change in zoom command.

Figure 4:
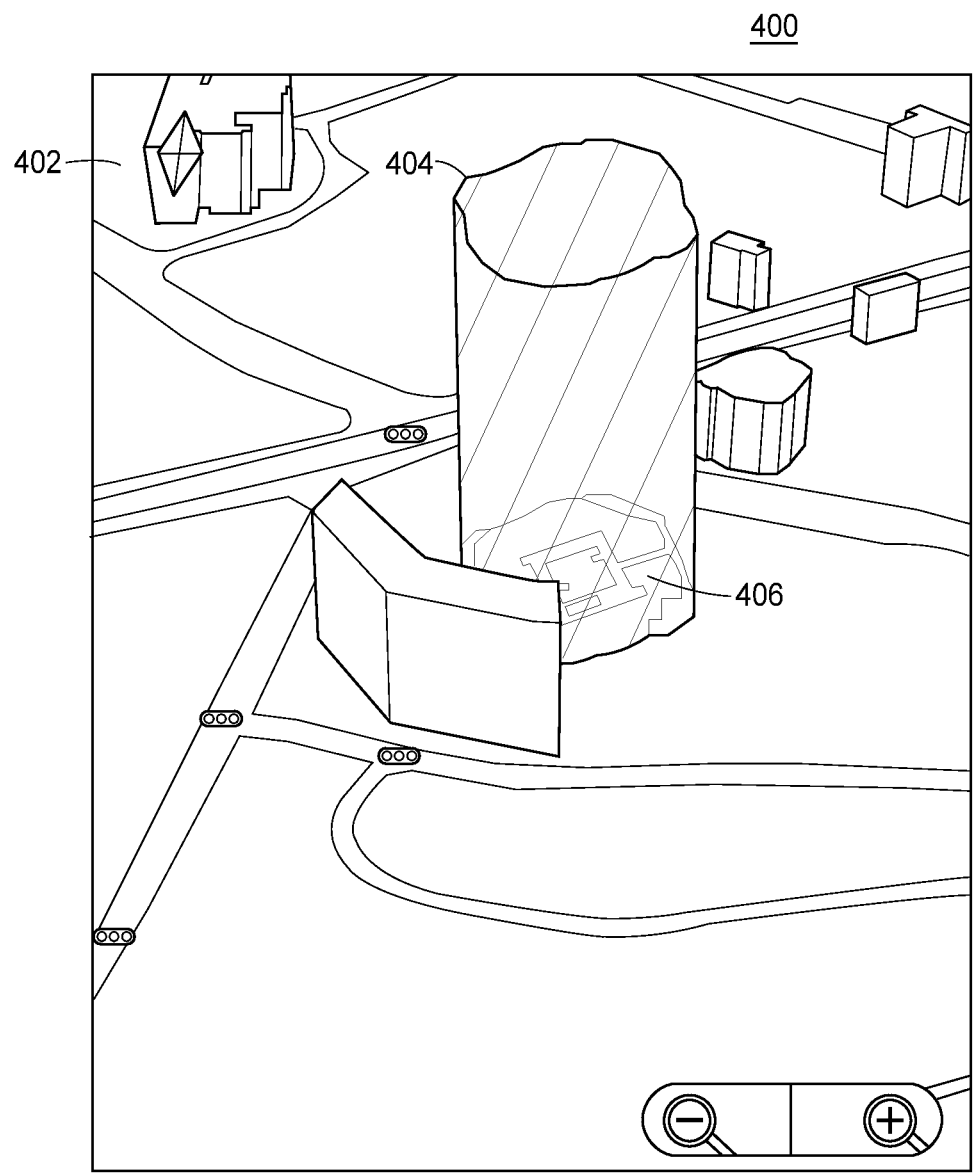
FIG. 4 is an example screenshot of a digital map including a partially transparent building with a visible interior floor map at an increased zoom level.

Now referring to FIG. 4, another example screenshot 400 illustrates a zoomed-in map of the geographic area 402 relative to the map of the geographic area 202 presented in FIGS. 2 and 3. The zoomed-in map 402 may include more details about the geographic area such as side streets, etc. The screenshot 400 also includes a more detailed partially transparent 3D representation of the building 404. As with FIG. 3, an interior floor map 406 is drawn inside the 3D space defined by the partially transparent 3D representation of the building 404. The more detailed partially transparent 3D representation of the building 404 may be more transparent (or substantially the same degree transparent) than the more detailed than the representation of the building 302. The screenshot 400 corresponds to the scenario in which the user has zoomed-in on a display as shown in FIG. 2 or 3 and the mapping software in response generated the zoomed-in map of the geographic area 402.

Figure 5:
FIG. 5 is an example screenshot of a digital map including a partially transparent building with a visible interior floor map at a further increased zoom level.

Now referring to FIG. 5, another example screenshot 500 illustrates a more zoomed-in map of the geographic area 502 relative to the zoomed-in map of the geographic area 402 presented in FIG. 4. The more zoomed-in map 502 may include even more details about the surrounding area, as well as a highly detailed, partially transparent 3D representation of the building 504. The more detailed interior floor map 506 may include much more detail than the interior floor maps 306 and 406. The more detailed interior floor map 506 may include text and icons to present more information about what features, places of business, etc. are located on that particular floor of the building. For example, the more detailed interior floor map 506 may include icons 508, 510 representing building features such as elevators 508 and the names of various businesses and an icon to indicate the type of business (e.g., the knife and fork icon 510).

The representation of the buildings 302, 402, and 502 discussed above may be made transparent using any of a number of suitable techniques. For example, alpha blending may be used. Additionally or alternatively, the map server 114 may generate different raster images with different levels of transparency and send these raster images to the computing device 112.

It is noted that internal building feature inspection module 144 that implements the techniques discussed with reference to FIGS. 1-5 provides an intuitive interface for inspecting indoor map data, separately or in conjunction with outdoor map data, without requiring that the user operate additional controls and without occluding significant portions of the map.

To further illustrate the techniques for providing an intuitive and efficient interface for inspecting indoor and outdoor map data, example methods which the internal building feature inspection module 144 may implement are discussed next with reference to FIGS. 6-8. More generally, these methods can be implemented in any suitable computing device and any suitable software application. For example, these methods can be implemented as sets of instructions stored on a tangible computer-readable medium and executable on a processor.

Figure 6:
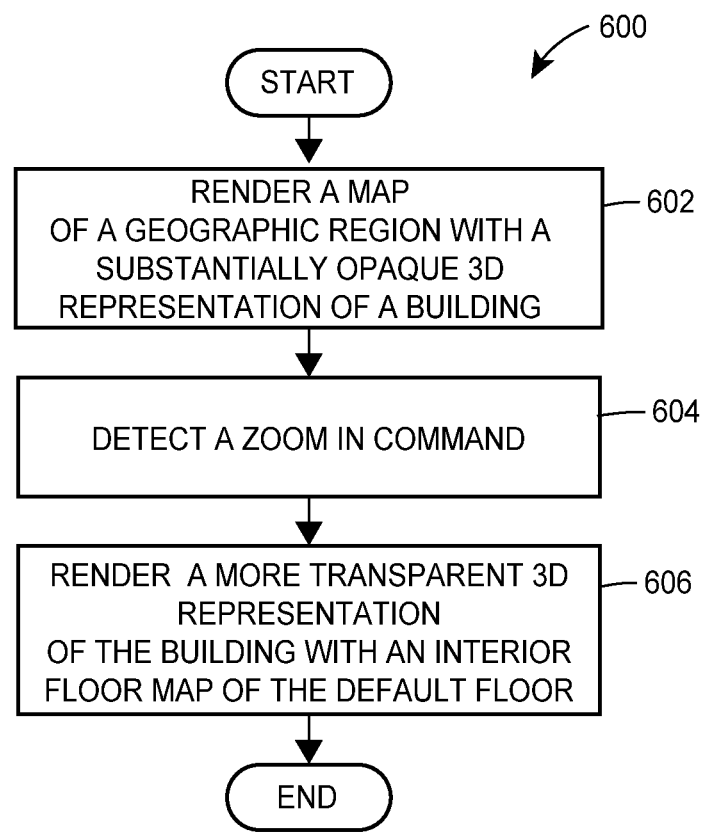
FIG. 6 is a flow diagram of an example method for displaying representations of a building on a digital map of a geographic region at different zoom levels.

The flow diagram of FIG. 6 illustrates an example method 600 for the progressive disclosure of interior floor maps of a building on a map of a geographic area. At block 602, an interactive digital map of a geographic region is rendered. The rendered digital map may be rendered using outdoor map data and may display map elements such as roads, buildings, parks, bodies of water, etc. The rendered digital map may include a substantially opaque 3D representation of a building located in the geographic region. A substantially opaque 3D representation of a building may be completely opaque or may be partially transparent, but the overall effect may be that any interior floor maps or other visual information drawn inside the space defined by the 3D representation of a building may be fully or partially obscured. At block 604, a zoom-in command may be detected. The zoom-in command may correspond to a spread event, for example, if a multi-touch interface is used. The zoom-in command may also correspond to a tap event on an on-screen button (e.g., the button 216 in FIG. 2). A version of the interactive digital map of a geographic region may be rendered with a more transparent 3D representation of a building located in the geographic region at block 606. The more transparent 3D representation of a building located in the geographic region may have an interior floor map of a default floor of the building drawn inside the space defined by the more transparent 3D representation of a building as described in the present disclosure.

Figure 7:
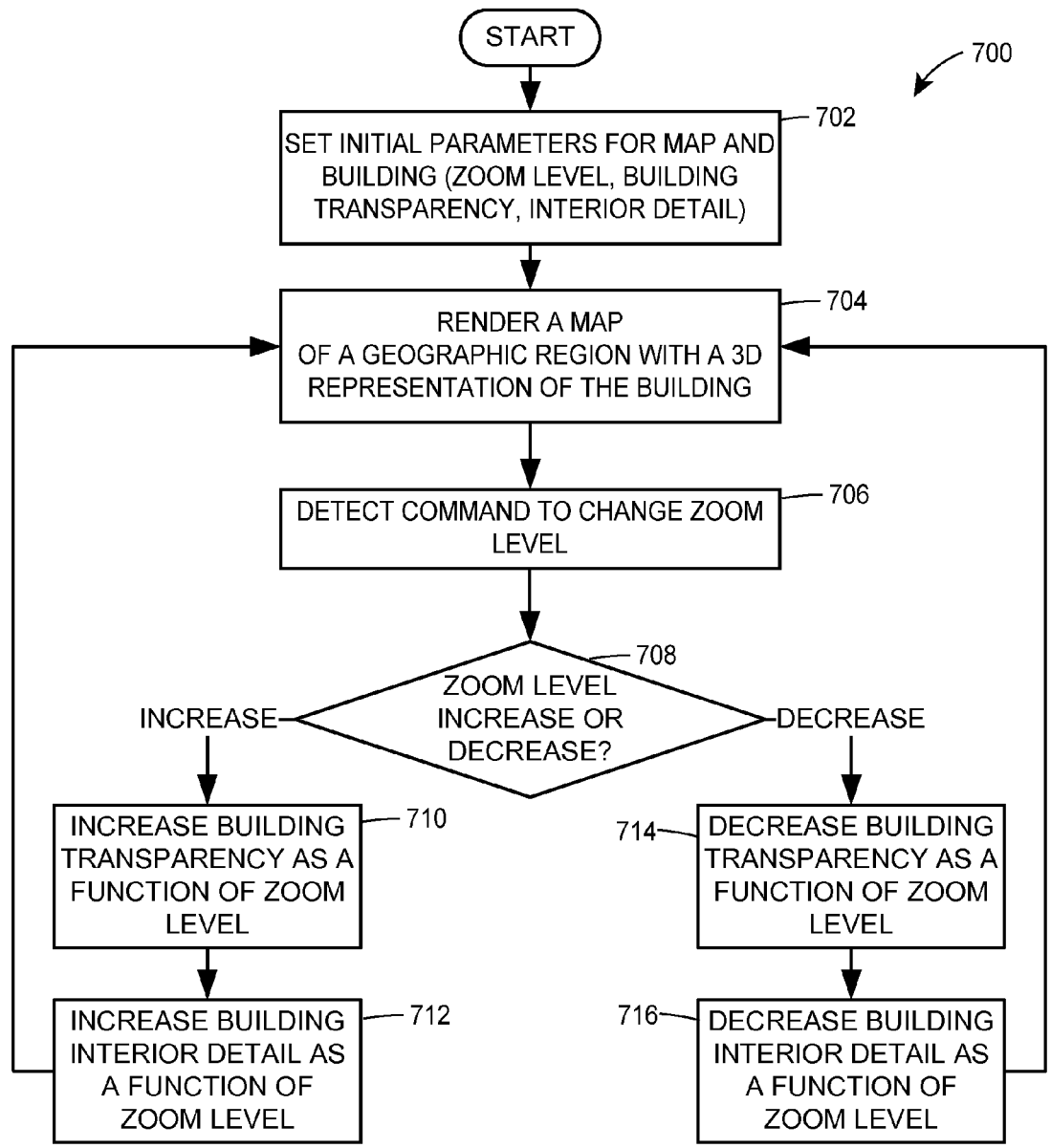
FIG. 7 is a flow diagram of another example method for displaying representations of a building on a digital map of a geographic region at different zoom levels.

FIG. 7 is a flow diagram of another example method 700 for the progressive disclosure of interior floor maps of a building on a map of a geographic area in response to user input to change zoom level. More particularly, a software module may implement the method 700 to allow a user to zoom in and out on a map of a geographic area and see a progressive disclosure (or hiding) of an interior floor map of a building. At block 702, initial parameters for the map of a geographic area are set. Initial parameters may include the initial zoom level, as well as the initial building transparency and initial interior floor map detail. The initial building transparency and initial interior floor map detail may be tied directly to the initial zoom level as a function of the current zoom level, or may be set independently. There may be a discrete number of zoom levels, for example eighteen zoom levels, corresponding to a global-scale view of a map all the way down to a block-by-block view of a map. Thus, it may be advantageous to set the initial zoom level to zoom level eight, which may correspond to a regional view. For example, a regional view of an address in Chicago may also include map data for locations in Indiana and Wisconsin.

Next, at block 704, the map of the geographic area is rendered, including a 3D representation of a building in which the building transparency and interior floor map detail are configured using the initial values. At block 706, a command to change zoom level may be detected. The command to change zoom level may be a zoom-in command or a zoom-out command. A zoom-in command may correspond to a spread event, for example, if a multi-touch interface is used. The zoom-in command may also correspond to a tap event on an on-screen button (e.g., the button 216 in FIG. 2). A zoom-out command may correspond to a pinch event, for example, if a multi-touch interface is used. The zoom-out command may also correspond to a tap event on an on-screen button (e.g., the button 218 in FIG. 2). At block 708, a software module determines whether the command to change zoom was a zoom-in command corresponding to an increase in zoom level or a zoom-out command corresponding to a decrease in zoom level.

If the zoom level is to be increased, a software module may increment a zoom level counter. At block 710, a software module may increase building transparency as a function of the zoom level. The zoom level may be tied mathematically to a transparency coefficient (e.g., a zoom level of 15 may correlate to a transparency level of 15/18 or 83%, a zoom level of 16 may correlate to a transparency level of 16/18 or 89%). Alternatively or additionally, the zoom level may be associated with one or more transparency thresholds (e.g., a zoom level of 14 may be associated with 50% transparency, a zoom level of 15 may be associated with 55% transparency, etc.). Similarly, at block 712 a software module may increase a interior map detail as a function of zoom. As with building transparency, interior map detail may be increased using one or more thresholds.

If the zoom level is to be decreased, a software module may increment a zoom level counter. At block 714, a software module may decrease building transparency as a function of the zoom level. The zoom level may be tied mathematically to a transparency coefficient (e.g., a zoom level of 16 may correlate to a transparency level of 16/18 or 89%, a zoom level of 15 may correlate to a transparency level of 15/18 or 83%). Alternatively or additionally, the zoom level may be associated with one or more transparency thresholds (e.g., a zoom level of 15 may be associated with 55% transparency, etc., a zoom level of 14 may be associated with 50% transparency). Similarly, at block 716 a software module may decrease a interior map detail as a function of zoom. As with building transparency, interior map detail may be decreased using one or more thresholds. After adjusting the zoom level, building transparency, and interior map detail, the method 700 may loop back and render the map according to the new parameters at block 704 and then again detect a command to change zoom level at block 706.

Figure 8:
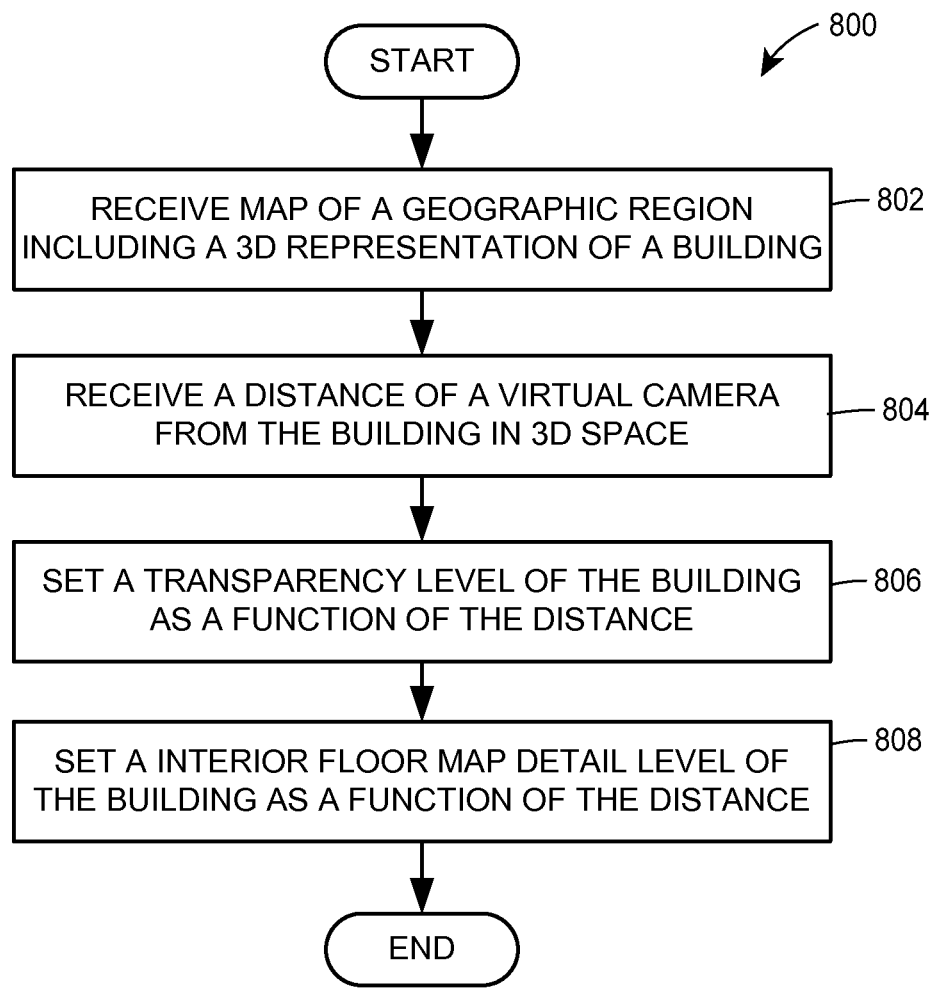
FIG. 8 is a flow diagram of an example method for generating and displaying representations of a building on a map of a geographic region at different distances of a virtual camera from the building.

FIG. 8 is a flow diagram of an example method 800 for the progressive disclosure of interior floor maps of a building on a map of a geographic area relative to the distance between a virtual camera and a 3D representation of a building. More particularly, a software module may implement the method 800 to allow a user to see a progressive disclosure (or hiding) of an interior floor map of a building based on moving the virtual camera. At block 802, a software module may receive a map of a geographic region including a 3D representation of a building for display. In order to display the map or a portion of the map, a software module may render a viewable version of the map by using a virtual camera and defining a view frustum. Accordingly, the display of the map may include a 2D map with 3D elements such as representations of buildings overlaying the 2D map as disclosed in the present disclosure, at whichever zoom level and angle of view that may be desirable. At block 804, a software module may receive a distance of the virtual camera from a 3D representation of a building in the frustum. The transparency level of the building may be set as a function of the distance between the virtual camera and the 3D representation of the building (e.g., using a direct mathematical relationship, using one or more threshold levels, etc.) at block 806. Similarly, the interior floor map detail may be set as a function of the distance between the virtual camera and the 3D representation of the building (e.g., using a direct mathematical relationship, using one or more threshold levels, etc.) at block 808. Then, at block 810, the map and the one or more overlaid 3D representations of buildings may be displayed. It may be advantageous to perform blocks 804-808 for each building in the frustum. Accordingly, the map displayed at block 810 may include numerous buildings at various levels of transparency with various levels of detail of interior floor maps depending on the distance from the virtual camera to the building. For example, an isometric view of downtown Chicago looking northeast may include a 3D representation of the Willis Tower that is relatively more transparent and with relatively more interior floor map detail than a 3D representation of the Richard J. Daley Center a few blocks to the northeast. However, it may be advantageous to allow the user to select one or more 3D representations of buildings to make partially transparent as a function of the distance of the virtual camera from that building. For example, a user may select the Willis Tower and not the Richard J. Daley Center, in which case the 3D representation of the Willis Tower will be made partially transparent as described above while the 3D representation of the Richard J. Daley Center is opaque. In either case, it will be understood that the user may input a command to move the virtual camera as discussed above, the method 800 may be performed again to adjust the display of the digital map accordingly.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described in the present disclosure as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described in the present disclosure.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described in the present disclosure. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described in the present disclosure may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to in the present disclosure may, in some example embodiments, comprise processor-implemented modules.

Similarly, the methods or routines described in the present disclosure may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used in the present disclosure, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions in the present disclosure using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in the present disclosure any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments in the present disclosure. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an interface for inspecting indoor and outdoor map data through the disclosed principles in the present disclosure. Thus, while particular embodiments and applications have been illustrated and described, it is to be understood that the disclosed embodiments are not limited to the precise construction and components disclosed in the present disclosure. Various modifications, changes and variations, which will be apparent to those skilled in the art, may be made in the arrangement, operation and details of the method and apparatus disclosed in the present disclosure without departing from the spirit and scope defined in the appended claims.

What is claimed is:

1. A method in a computing device for providing an intuitive display of a building on a digital map, the method comprising:
    displaying a digital map of a geographic area via a user interface of the computing device from a perspective of a virtual camera;
    displaying, on the digital map, a three-dimensional (3D) representation of a building located in the geographic area, including displaying an external shell of the building;
    receiving, via the user interface, a request to change a position of the virtual camera to approach the 3D representation of the building;
    in response to the received request, changing the position of the virtual camera to approach the 3D representation of the building; and
    as the position of the virtual camera is changed to approach the 3D representation of the building, (i) when a distance between the position of the virtual camera and the 3D representation of the building meets or exceeds a threshold value, increasing transparency of the external shell of the building while the partially transparent external shell completely obscures indoor map information within the 3D representation of the building and (ii) when the distance between the position of the virtual camera and the 3D representation of the building is smaller than the threshold value:
        revealing the indoor map information within the 3D representation of the building through the partially transparent external shell, and
        increasing a detail of the indoor map information within the 3D representation of the building.

2. The method of claim 1, further comprising, prior to changing the position of the virtual camera:
    rendering the external shell of the building in an opaque manner;
    detecting a selection of the 3D representation of the building via the user interface; and
    in response to the selection, rendering the external shell of the building in a partially transparent manner.

3. The method of claim 2, wherein detecting the selection of the 3D representation of the building via the user interface includes detecting a tap gesture.

4. The method of claim 1, wherein increasing transparency of the external shell of the building includes progressively increasing transparency of at least one of (i) a vertical wall and (ii) a roof.

5. The method of claim 1, wherein receiving the request to change the position of the virtual camera includes receiving a zoom command.

6. The method of claim 1, wherein the building is a multi-story building; the method further comprising:
    identifying a default floor of the multi-story building,
    wherein the indoor map information for the building includes a floor map of the default floor.

7. The method of claim 1, wherein the indoor map information for the building includes a floor map comprising one or more of:
    (i) a layout of internal walls or dividers,
    (ii) names of entities occupying different portions of a default floor of the building, and
    (iii) locations of elevators, escalators, and restrooms.

8. The method of claim 1, wherein increasing transparency of the external shell of the building includes applying, for a plurality of discrete zoom levels, a plurality of respective transparency values.

9. A computing device comprising:
    a user interface including a display device;
    one or more processors; and
    a memory storing thereon instructions that, when executed by the one or more processors, cause the computing device to:
        display a digital map of a geographic area via the user interface from a perspective of a virtual camera;
        display, on the digital map, a three-dimensional (3D) representation of a building located in the geographic area, wherein the 3D representation of the building includes an external shell;
        receive, via the user interface, a request to change a position of the virtual camera to approach the 3D representation of the building,
        in response to the received request, change the position of the virtual camera to approach the 3D representation of the building, and
        as the position of the virtual camera is changed to approach the 3D representation of the building, (i) when a distance between the position of the virtual camera and the 3D representation of the building meets or exceeds a threshold value, increase a transparency of the external shell while the partially transparent external shell completely obscures associated internal features of the building within the 3D representation of the building and (ii) when the distance between the position of the virtual camera and the 3D representation of the building is smaller than the threshold value:
            reveal the associated internal features within the 3D representation of the building through the partially transparent external shell, and
            increase a detail of the associated internal features within the 3D representation of the building.

10. The computing device of claim 9, wherein the instructions further cause the computing device to:
    receive, via the user interface, an additional request to change the position of the virtual camera to distance from the 3D representation of the building,
    in response to the received additional request, change the position of the virtual camera to distance from 3D representation of the building, and
    as the position of the virtual camera is changed to distance from the 3D representation of the building, simultaneously (i) decrease a transparency of the external shell and (ii) decrease a detail of the associated internal features within the 3D representation of the building.

11. The computing device of claim 9, wherein the instructions cause the computing device to change the position of the virtual camera in response to a zoom command.

12. The computing device of claim 9, wherein the external shell includes at least one of (i) vertical walls and (ii) a roof.

13. The computing device of claim 9, wherein the associated internal features of the building include a floor map comprising one or more of:
- (i) a layout of internal walls or dividers,
- (ii) names of entities occupying different portions of a default floor of the building, and
- (iii) locations of elevators, escalators, and restrooms.

\* \* \* \* \*